US005782410A

United States Patent [19]

Weston

[11] Patent Number: 5,782,410

[45] Date of Patent: Jul. 21, 1998

[54] FLUID FLOW CONTROL DEVICE

[76] Inventor: Colin K. Weston, RR #3, 499 Carlisle Rd., Campbellville Ontario, Canada, L0P 1B0

[21] Appl. No.: 593,147

[22] Filed: Feb. 1, 1996

Related U.S. Application Data

[63] Continuation-in-part of Ser. No. 331,960, Oct. 31, 1994, Pat. No. 5,598,973.

[51] Int. Cl.[6] .............................. B67D 5/06; F16K 1/38

[52] U.S. Cl. .............................. 239/63; 239/75; 239/583

[58] Field of Search .............................. 239/583, 71, 75, 239/784, 63, 581.2, 74; 251/129.16, 273; 222/386

[56] References Cited

U.S. PATENT DOCUMENTS

| | | | |
|---|---|---|---|
| 3,429,482 | 2/1969 | Nord | 239/583 |
| 4,579,255 | 4/1986 | Frates | 222/149 |
| 4,711,379 | 12/1987 | Price | 222/504 |
| 4,907,741 | 3/1990 | McIntyre | 239/124 |
| 4,976,404 | 12/1990 | Ichicawa et al. | 251/121 |
| 5,348,585 | 9/1994 | Weston | 118/305 |

FOREIGN PATENT DOCUMENTS

| | | | |
|---|---|---|---|
| 2589784 | 5/1987 | France | 239/75 |

*Primary Examiner*—Kevin Weldon

*Attorney, Agent, or Firm*—Donald E. Hewson

[57] ABSTRACT

An automatic continuous flow liquid dispensing device for dispensing liquid onto a receiving surface of an article includes an improved flow control mechanism comprising a threaded elongate shaft retained in threaded engagement by a base member securely attachable to the external housing, so as to be selectively rotatably movable to any one of a plurality of stop positions. The threaded shaft is positioned to be contactable by a valve of the dispensing device, thereby acting as a backstop to preclude the valve from reaching its full flow position, and thus defining a plurality of partial flow positions. An electric motor rotates the threaded shaft in first and second rotational directions, to selected stop positions. Electrical controls are connected in electrically conductive relation to the electric motor for selective control thereof. Sensors are mounted on the dispensing device to sense ongoing conditions of selected parameters representative of specific circumstances related to the operation of the liquid dispensing device, and to generate quantitative values corresponding to the selected parameters. The sensors are connected in electrically conductive relation to the electrical control so as to provide feedback signals thereto. The feedback signals are derived from the quantitative values generated by the sensors. The electrical control process the feedback signals in real time and provide control signals to the electric motor. The control signals are a function of the feedback signals from the sensors, and thereby control the electric motor in accordance with the quantitative values.

13 Claims, 5 Drawing Sheets

FLUID FLOW CONTROL DEVICE

This application is a continuation-in-part of Ser. No. 08/331,960 filed Oct. 31, 1994, now U.S. Pat. No. 5,598, 973.

FIELD OF THE INVENTION

This invention relates to liquid dispensing guns used in industry, such as glue dispensing guns, paint dispensing guns, and the like, and more particularly to mechanisms for controlling the flow rate of such liquid dispensing guns, and especially for maintaining a constant flow rate under a variety of changing conditions.

BACKGROUND OF THE INVENTION

Liquid dispensing guns are used in industry for a variety of applications. Such applications might include the dispensing of adhesives to a carton or the like, which adhesives might include hot melt, atmospheric setting, ultraviolet setting, temperature based curing adhesives, and self curing epoxies, among others; the dispensing of paint to an ornament or decorative object; the dispensing of lubricants to various parts of mechanisms or machines; and the dispensing of sealants to a wide variety of articles, among other applications. It is common to have such liquid dispensing guns operatively connected to a robotic arm or to an X-Y-Z table. In either case, the motion of the dispensing gun with respect to the article having liquid deposited thereon is independently controlled in each of the X, Y, and Z axes, and can be determined at any time or point along the path of the dispensing gun. The speed of the dispensing nozzle across the receiving surface is the vectorial sum of the X, Y, and Z components of the speed and may be calculated using the equation:

$$\text{surface speed}=(\text{speed in X direction}^2+\text{speed in Y direction}^2+\text{speed in Z direction}^2)^{1/2}$$

The dispensing guns for each particular application are designed so as to be specifically suited to that application. Each type of dispensing gun uses a valve, such as a needle valve, located within the nozzle of the dispensing gun at a dispensing aperture therein to open and close the dispensing output. The valve means is moveable, typically by way of an air actuated solenoid, between a full flow position where the liquid contained in the dispensing gun is dispensed through the dispensing aperture in the nozzle, and a flow precluding position where the valve means is intimately engaged against a co-operating seat so as to preclude the flow of liquid from the nozzle. In the full flow position, the needle valve contacts a back stop, thus defining the full flow position of the needle valve.

The flow rate of the fluid from such dispensing guns is selected depending on the particular application, the properties of the particular liquid being dispensed, and so on. It is important to select a proper flow rate as it is important to apply such liquids as a constant volume per unit length of liquid dispensed, with any more than a very minor variation being generally unacceptable. Most dispensing guns have manually selectable flow rate that is set by way of a hand operated control mechanism that positions the back stop so as to define the full flow position of the needle valve. This full flow position is typically set only once for a given application. A selected flow rate is, by definition, a constant volume of liquid flow per unit time. If the nozzle of the dispensing gun travels across the receiving surface at a constant speed, a corresponding constant volume of liquid will be dispensed per unit length of liquid dispensed along the receiving surface. However, if the nozzle of the dispensing gun does not travel across the receiving surface at a constant speed, the volume of liquid dispensed per unit length of liquid dispensed along the receiving surface will vary proportionately with the speed of travel of the nozzle across the receiving surface.

It is very important to be able to maintain a constant application of the liquid being dispensed per unit length of liquid dispensed along the receiving surface so as to preclude over-dispensing or under-dispensing. The amount of the liquid dispensed along an application path on a receiving surface can change as one or more of several related parameters change, such parameters including the speed of the nozzle of the dispensing gun with respect to the receiving surface, the temperature of the liquid, the viscosity of the liquid, the narrowing of the dispensing opening of the nozzle due to partial clogging, and so on. For instance, if the nozzle of the dispensing gun tracks a square corner, the speed of the nozzle across the receiving surface near or at the corner is less than the targeted predetermined speed of the nozzle across the receiving surface. In this instance, since the actual dispensing rate per unit time of the liquid from the nozzle does not change, an increase occurs in the amount of liquid dispensed per unit length of liquid dispensed at the corner—in other words, excess liquid is dispensed at the corner. Further, as the temperature of the liquid being dispensed rises, the viscosity may either fall or rise, depending on the type of liquid, which therefore causes a corresponding change in the amount of flow of liquid from the nozzle per unit time, and a corresponding change in the amount of liquid dispensed per unit length of liquid dispensed along the receiving surface. Also, as the dispensing of the liquid continues, it is possible that the nozzle can partially clog, thus reducing the amount of liquid dispensed per unit time, thus reducing the amount of liquid dispensed per unit length of liquid dispensed along the receiving surface. In any event, any substantial change in amount of liquid dispensed per unit length of liquid dispensed along the receiving surface is unacceptable.

It can be seen that it is necessary to control the rate of flow of liquid from a nozzle per unit time in order to regulate the amount of liquid per dispensed unit length of liquid dispensed along the receiving surface. For instance, as the nozzle traverses a right angled corner, the rate of liquid dispensed from the nozzle per unit time must be slowed in proportion to the speed of the nozzle across the receiving surface. This same principle also applies to a rounded corner.

Further, as the temperature of the liquid being dispensed rises, and the viscosity correspondingly drops, the amount of liquid flowing from the nozzle per unit time may increase, even though the size of the opening in the nozzle has not increased. Accordingly, the size of the opening in the nozzle may have to be correspondingly decreased. Further, as the nozzle becomes partially clogged through continuing use, it may be necessary to further open the valve within the nozzle so as to maintain a constant flow of liquid therefrom per unit length of liquid dispensed along the receiving surface.

Another problem with such prior art liquid dispensing guns is that the air actuated solenoid that operates the needle valve tends to open and close the valve quite abruptly, thus causing sudden and severe pressure changes in the liquid in the liquid containing main chamber. Accordingly, it is typical to have a sudden, but short lived, overflow of liquid shoot forth from the nozzle of dispensing gun when the valve is first opened, which is highly undesirable, if not unacceptable.

DESCRIPTION OF THE PRIOR ART

U.S. Pat. No. 4,711,379 issued Dec. 8, 1987 to PRICE, discloses a proportional flow control dispensing gun that is pneumatically actuated and electrically controlled. In order to dispense a liquid from the dispensing gun, the liquid is supplied under pressure to a main chamber so as to be dispensable through a nozzle past a valve. To commence the flow of liquid, a torque motor is electrically actuated so as to move an air loaded spool downwardly against the force of a biasing spring. As the air loaded spool moves downwardly, a land thereon is passed a port so as to permit a passageway to be in fluid communication with a source of pressurized air. The other end of the passageway is in fluid communication with a piston mounted on the opposite end of the biasing spring, which piston moves upwardly with the equalized increase in air pressure against its bottom surface. As this piston moves upwardly, the control plug of the valve is moved away from its seat so as to permit the valve to open. The amount of valve opening is proportional to the amount of electrical power supplied to the torque motor. There are no feedback systems used to adjust the position of the control plug of the valve in accordance with changes in speed of the dispensing gun with respect to the receiving surface, temperature, viscosity, blockage of flow from the nozzle, and so on.

Indeed, it has been suggested in the patent document that since pressurized air is used to actuate the valve, that a balanced air valve needs to be used unless the source of compressed air is highly regulated.

U.S. Pat. No. 4,976,404 issued Dec. 11, 1990 to ISHIKAWA et al which discloses a flow control valve having a wide flow rate range and excellent linearity between the degree of valve opening and the flow rate. The valve includes a cylindrical or conical valve head disposed within an outside casing and formed on a circular truncated cone-shaped working face which is tapered towards the outlet of the valve. The valve head is shaped so that the rate of change of the flow rate with respect to the valve stroke is small and linear. The fine control of the flow rate can be accurately achieved over the entire flow range. A servo motor, or the like, is employed as the drive source for operating the valve.

U.S. Pat. No. 5,348,585 issued Sep. 20, 1994 to WESTON, discloses a liquid dispensing apparatus for use in conjunction with a two axis of movement robotic table adapted to hold a workpiece in a given position. The workpiece has a receiving surface for receiving liquid dispersed from said liquid dispensing apparatus. The liquid dispensing apparatus accurately dispenses known volumes of liquid onto the receiving surface of the workpiece. The apparatus comprises a cartridge having a longitudinal axis and defining a reservoir for containing an amount of liquid therein, the cartridge having an outlet of known cross sectional area. A piston is positioned within the cartridge and is adapted for translational movement therewithin along the longitudinal axis. The displacement of the piston within the cartridge, with respect to the outlet, defines the volume of the reservoir. There is a driving means for effecting translational movement of the piston with respect to the cartridge so as to cause a change in the volume of the reservoir, and a control means for operating the driving means. An interconnection means having a threaded portion thereon mechanically interconnects the piston and the driving means, such that the driving means may rotatably drive the piston within the cartridge. A first retaining means retains the interconnection means in threadably engaged relation thereto. A second retaining means retains the interconnection means in freely rotatable non-threaded relation thereto. One of the first and second retaining means is securely connected to the piston and the other of the first and second retaining means is securely connected to the cartridge. The interconnection means is longitudinally rigid between the first retaining means and the second retaining means thereby to preclude unwanted relative movement along the longitudinal axis of the piston with respect to the cartridge. When the piston is advanced towards the outlet by way of a known degree of rotation along the cartridge means, the piston advances along the cartridge by a known amount to thereby dispense a known volume of the liquid from the reservoir through the outlet. The rate of liquid dispensing from the reservoir is substantially proportional to the relative speed of the outlet with respect to the workpiece, in a direction substantially perpendicular to the receiving surface of workpiece. At the end of each piston advancement that disperses liquid from said reservoir through said outlet, a piston retracting means is selectively actuated so as to slightly retract the piston a minor amount within the cartridge.

French patent No. 2,589,784 issued May 15, 1987 to PERETTE, which discloses equipment for mixing and dispensing foamed polyurethane resin, which equipment involve the use of electronic control systems for electromechanical devices to control the operation of heating systems, reagent metering pumps, a cooling system, a compressed air supply, and a electromechanical valves for controlling the feeds to a pistol for delivering the foam. The electronic control systems utilize signals from suitable sensors, and compare the signals with limiting values programmed into a microprocessor so that the dispensing gun can not operate unless the various parametric conditions are consistent with preparation of a satisfactory foam.

SUMMARY OF THE INVENTION

In accordance with one aspect of the present invention, there is provided an automatic continuous flow liquid dispensing device for dispensing liquid onto a receiving surface of an article. The dispensing device has a main chamber defined by an external housing, an inlet for accepting liquid pumped from a remote source into the main chamber, a dispensing nozzle terminating in a remote outer end with a dispensing aperture of a selected cross-sectional area at the remote outer end of the dispensing nozzle, the dispensing aperture being in fluid communication with the main chamber, and valve means operatively mounted with respect to the external housing for selective positioning in either one of a full flow position and a flow precluding position. The liquid dispensing device includes an improved flow control mechanism, comprising a threaded elongate shaft operatively retained in threaded engagement by a base member securely attachable to the external housing, so as to be selectively rotatably movable to any one of a plurality of stop positions, whereat the threaded elongate shaft is positioned to be contactable by the valve means, thereby acting as a backstop to preclude the valve means from reaching the full flow position, and thus defining a plurality of partial flow positions. An electrically powered drive means is mounted on the base member so as to engage the threaded elongate shaft in driving relation, whereby the threaded elongate shaft is rotatable by the electrically powered drive means in first and second rotational directions, thereby moving the threaded elongate shaft to a selected one of the plurality of stop positions. Control means are operatively connected in electrically conductive relation to the drive means for selectively controlling the drive means. Sensor means are mounted on the external housing to sense ongoing conditions of selected parameters representative of specific circumstances related to the operation of the liquid dispensing device, and to generate quantitative values corresponding to the selected parameters. The sensor means are connected in electrically conductive relation to the control means so as to provide feedback signals to the control means. The feedback signals are derived from the quantitative values generated by the sensor means. The control means is adapted to process the feedback signals in real time and to provide control signals to the drive means, the control signals being a function of the feedback signals from the sensor means. The control means thereby controls the drive means in accordance with the quantitative values.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Figure 1:
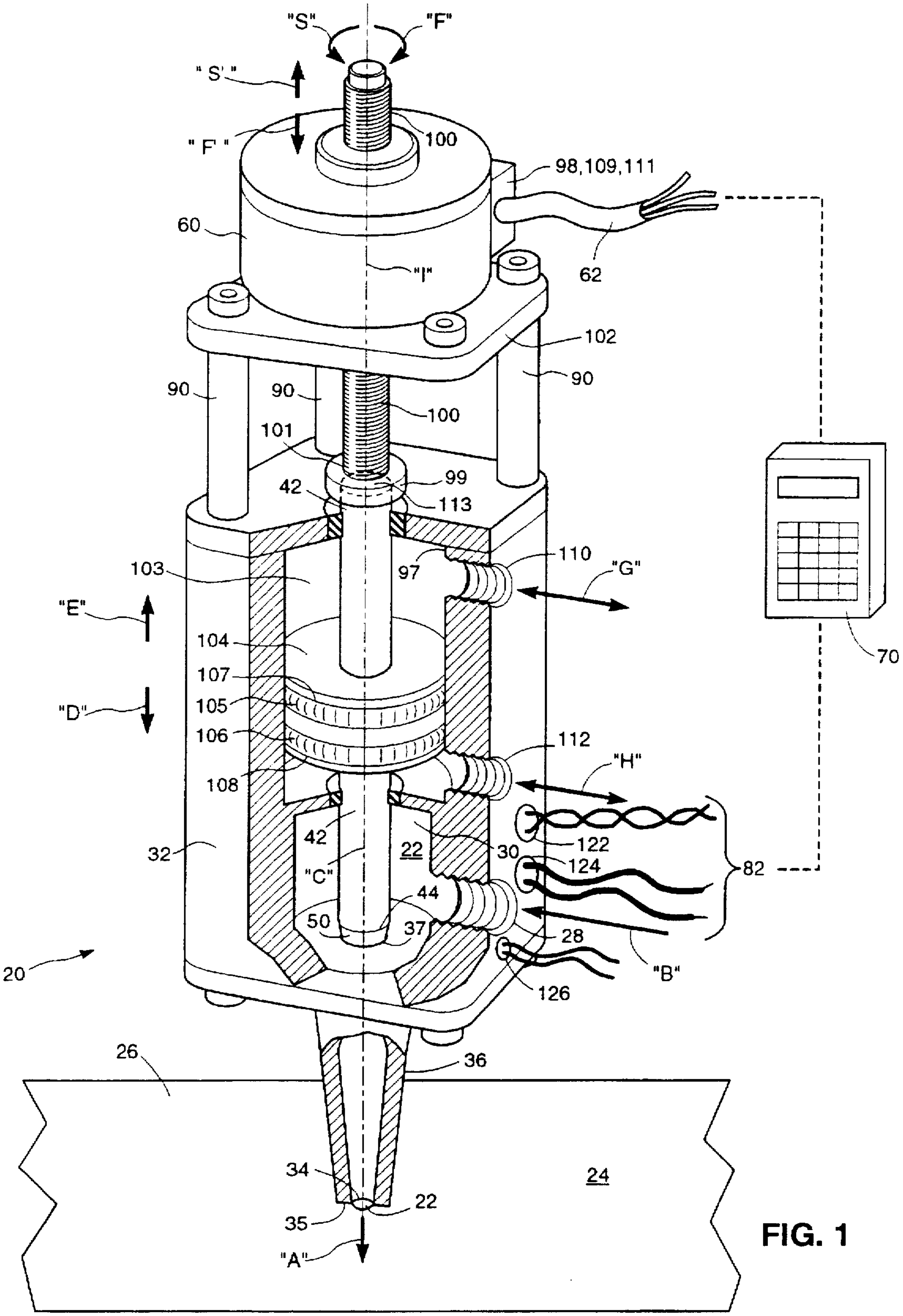
FIG. 1 is a perspective view of a preferred embodiment of the automatic continuous flow liquid dispensing device according to the present invention, with the valve being in its flow precluding position;.

Reference will now be made to FIGS. 1 through 5, which show a preferred embodiment of the automatic continuous flow liquid dispensing device 20 of the present invention, for dispensing liquid 22 onto a receiving surface 24 of an article 26, as indicated by arrow "A". The dispensing device 20 has an inlet 28 for accepting the liquid 22 into a main chamber 30 defined by an external housing 32 as indicated by arrows "B". A dispensing nozzle 36 extends outwardly from the end of the external housing 32 and terminates in a remote outer end 35 with a dispensing aperture 34 of a selected cross-sectional area disposed at the remote outer end. The cross-sectional area of the dispensing aperture 34 is known, and is established so that a rate of flow for the liquid being dispensed can be calculated. The dispensing aperture 34 is in fluid communication with the main chamber 30 of the liquid dispensing device 20, to permit the egress of liquid from the dispensing nozzle 36.

Figure 3:
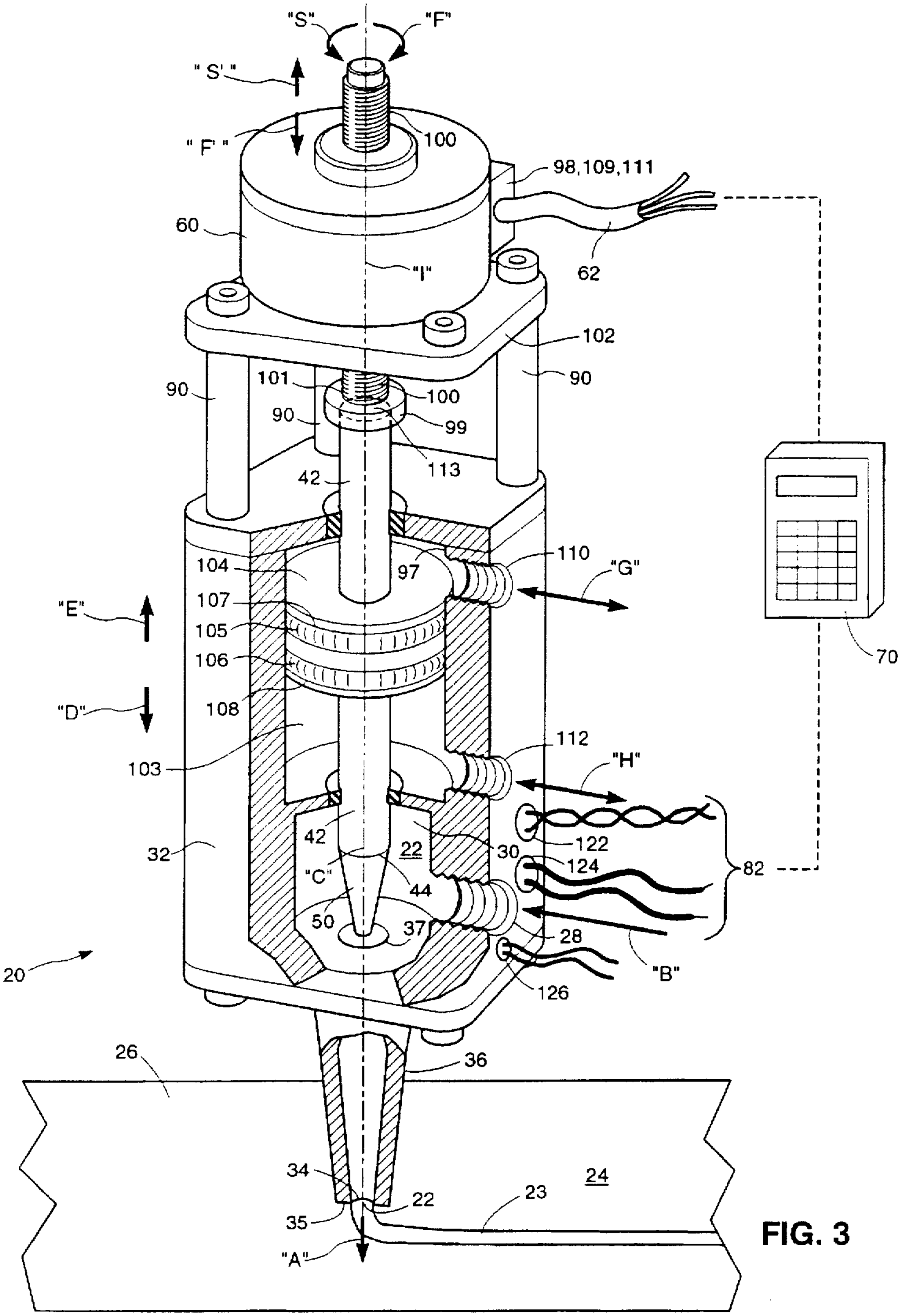
FIG. 3 is a view similar to FIG. 1, with the valve being in a full flow position, as determined by the improved flow control mechanism of the liquid dispensing device, to allow for a maximum amount of liquid to flow.
Figure 4:
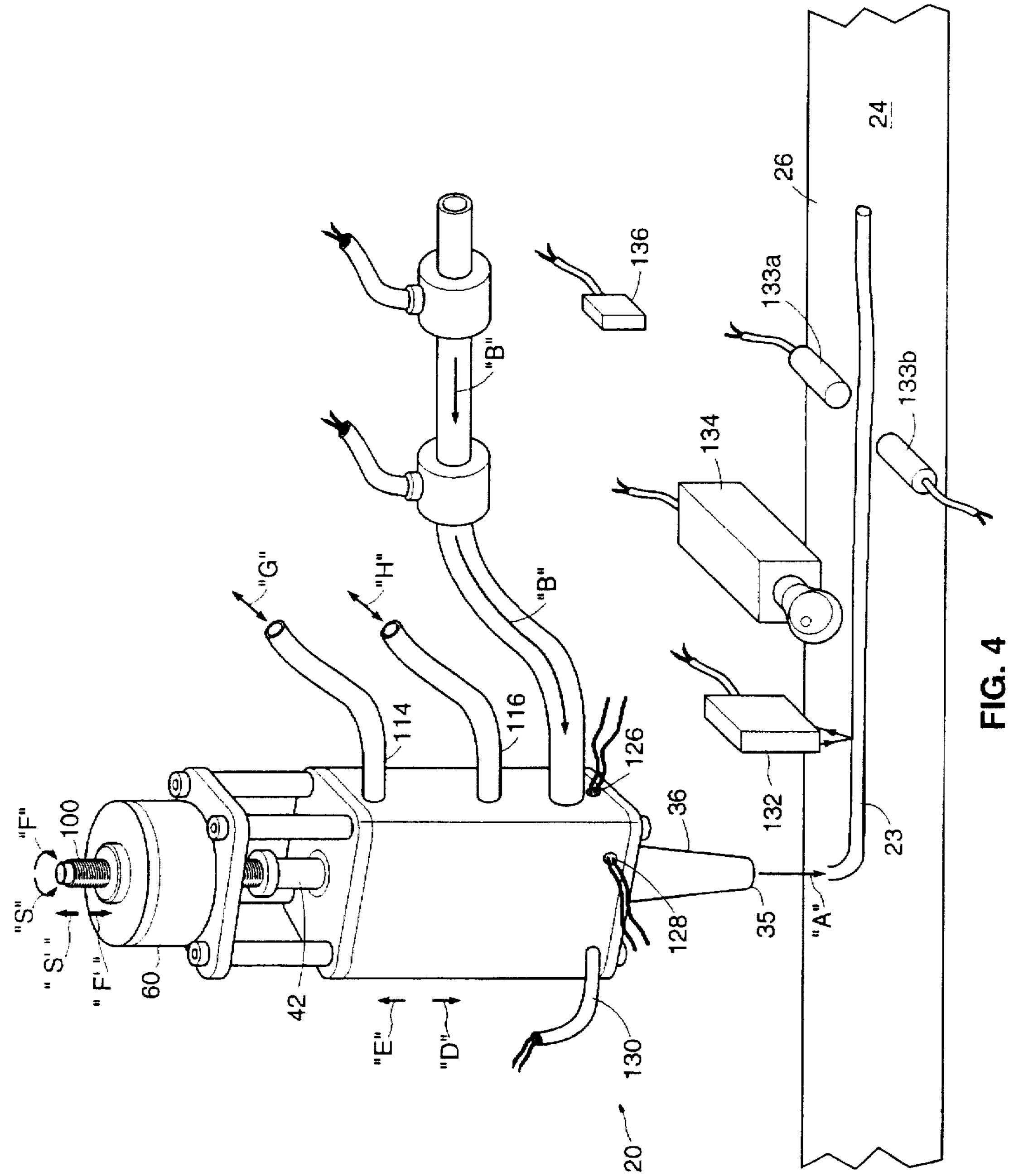
FIG. 4 is an overall perspective view of the present invention according to FIG. 1, also showing various types of sensors used to sense ongoing conditions of selected parameters related to the operation of the present invention.
Figure 5:
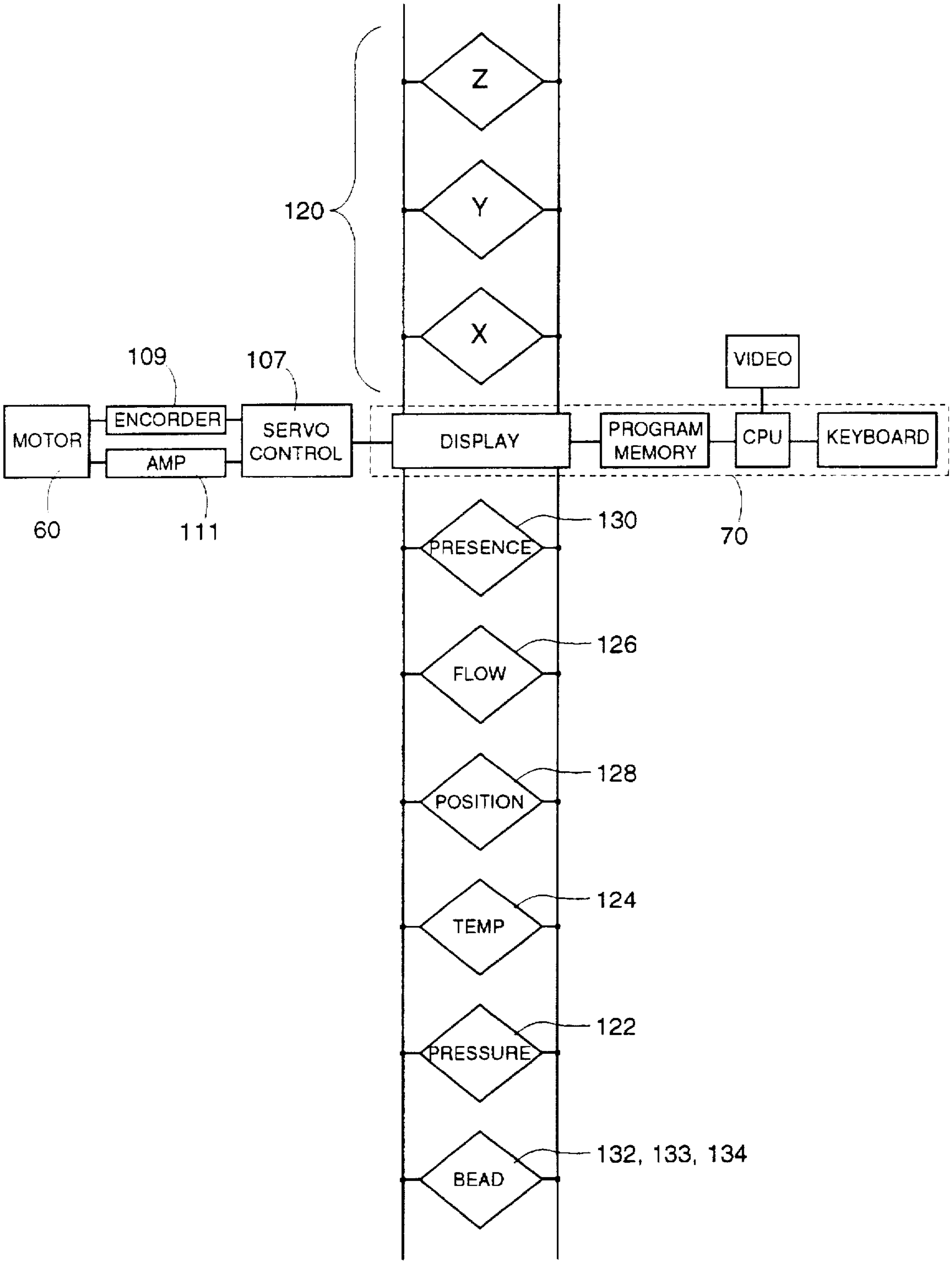
FIG. 5 is a schematic representation of the electrical circuitry of the present invention as shown in FIG. 1.

A valve means is operatively mounted with respect to the external housing 32, and is preferably in the form of a needle valve 50 is securely attached to the front end 44 of an elongate shaft 42 for corresponding axially directed movement therewith. The needle valve 50 is retained within the external housing 32 for reciprocating linear movement with the elongate shaft 42 along the longitudinal axis "C", as indicated by arrows "D" and "E", between a full flow position, as shown in FIG. 3, where the needle valve 50 is retained in spaced relation with respect to the dispensing aperture 34 so as to permit a full flow of liquid from the main chamber 30 through the dispensing aperture 34, and a flow precluding position, as shown in FIG. 1, where the needle valve 50 is intimately engaged against a co-operating seat portion 37 of the external housing 32 so as to preclude liquid flow between the needle valve 50 and the co-operating seat portion 37, thereby precluding fluid flow through the dispensing aperture 34.

The elongate shaft 42 is securely connected to a piston 104 slidably retained within an enlarged chamber 103, for reciprocating linear movement within the enlarged chamber 103, as indicated by arrows "D" and "E". The piston 104 has a pair of annular seals 105, 106 retained within co-operating annular grooves 107, 108. The annular seals 105, 106 are preferably made from silicone rubber so as to withstand the high chambers within the external housing 32, and slidingly engage in sealing relation the co-operating inner wall surface 97 of the enlarged chamber 103. The position of the piston 104 within the enlarged chamber 103 is controlled by the operator of the liquid dispensing device 20, by means of selected ingress and egress into the enlarged chamber 103 of compressed air through first and second apertures 110, 112, as indicated by double ended arrows "G" and "H", as supplied by suitable supply lines 114, 116, as can best be seen in FIG. 4.

The piston 104 is slidably moved within the chamber 103 so as to move the needle valve 50 between its flow precluding position, where the needle valve 50 is seated against the co-operating seat portion 37, and its full flow position.

In addition to the needle valve 50 being selectively movable, under the control of an operator, between a full flow position and a flow precluding position, a separate improved flow control mechanism is used to control the position of the needle valve 50 so as to stop at a selected one of a plurality of partial flow positions, as opposed to its full flow position. In this manner, the needle valve 50 can be used to accurately control the rate of the flow of liquid through the dispensing aperture 34 in the nozzle 36, in accordance with changes in various operational parameters of the automatic continuous flow liquid dispensing device 20, as will now be described in detail.

Figure 2:
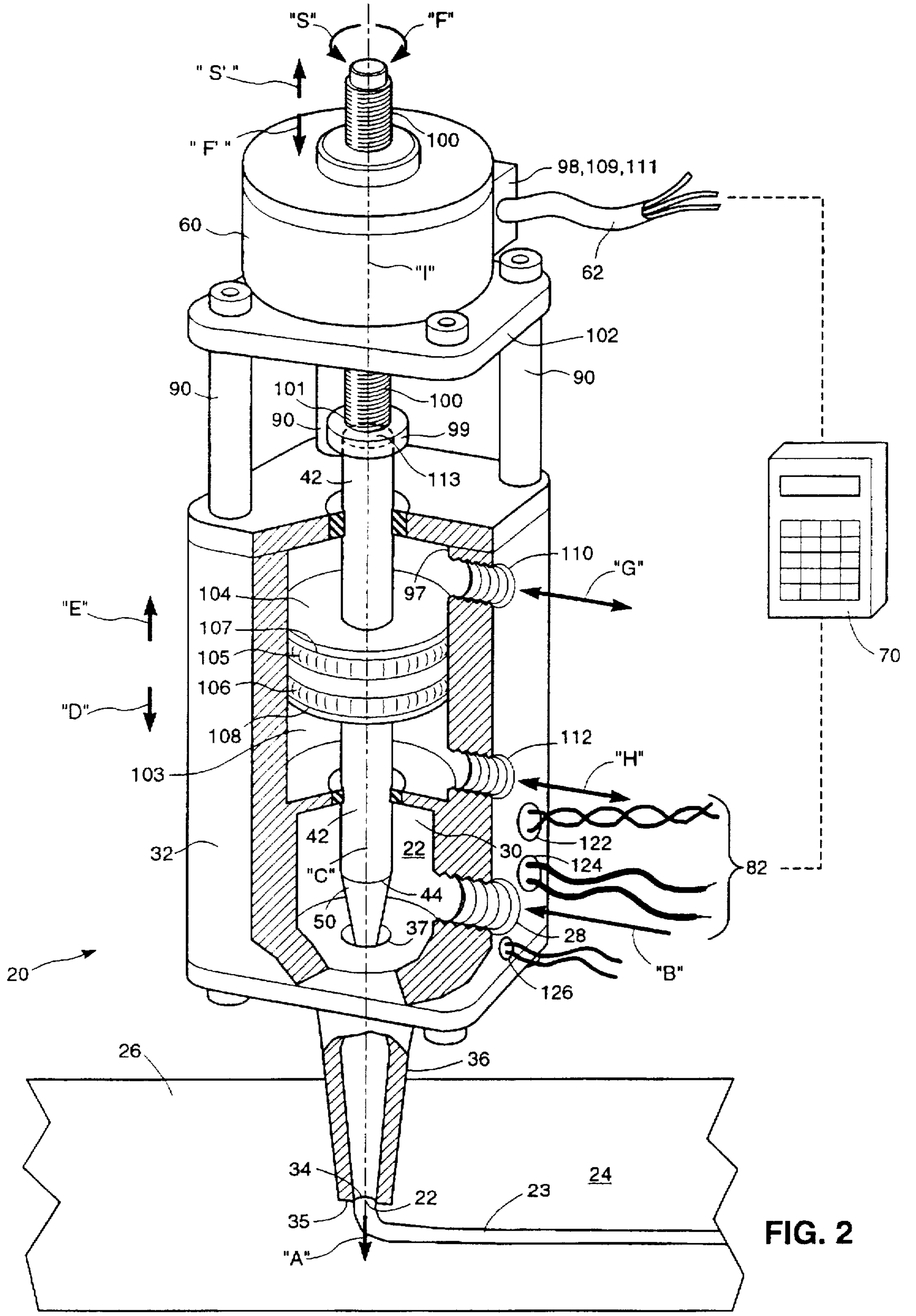
FIG. 2 is a view similar to FIG. 1, with the valve being in a partial flow position, as determined by the improved flow control mechanism of the liquid dispensing device, to allow for a selected amount of liquid to flow.

A threaded elongate shaft 100 is retained in threadable engagement by a co-operating base member 102 securely attached to the top end 33 of the external housing 32 by extension legs 90. An electrically powered drive means in the form of a servomotor 60, having an integral servo control 107, an integral encoder 109, and an integral amplifier 111, is mounted on the base member 102 so as to engage the threaded elongate shaft 100 in driving relation. The threaded elongate shaft 100 is thereby selectively rotatably movable about a centrally disposed longitudinal axis "T" by the servomotor 60 in first and second rotational directions, as indicated by arrows "F" and "S" in FIGS. 1 through 3. Such rotation of the threaded elongate shaft 100 in the first and second rotational directions "F" and "S" causes corresponding axially directed movement of the threaded elongate shaft 100, as indicated by arrows "F'" and "S'", to any selected one of a plurality of stop positions, one of which stop positions is shown in FIG. 2. In the various stop positions, the threaded elongate shaft 100 is positioned to be contactable by the needle valve 50, or more specifically, by an extension of the needle valve 50, namely the piston 104. A stop 105 on the bottom end 101 of the second threaded elongate shaft 100 contacts a friction pad 113 on the top of a shaft 112 extending upwardly from the piston 104 when the needle valve 50 is actuated towards its full flow position. In this manner, the threaded elongate shaft 100 acts as a mechanical backstop for the needle valve 50, to preclude the needle valve 50 from reaching its full flow position, and thus defining a plurality of partial flow positions.

A control means in the form of a microprocessor 70 is connected in electrically conductive relation to the servomotor 60 by means of electrical wires 62, so as to provide control signals to the servomotor 60, thus selectively controlling the servomotor 60. In this manner, the microprocessor 70 causes the servomotor 60 to move the threaded elongate shaft 100 to any selected one of a plurality of partial flow positions, and thus controls the movement of the needle valve 50 in its corresponding plurality of partial flow positions. The microprocessor 70 further comprises adjustment means (not shown) for adjusting the control signals produced by it, thereby permitting adjustment of the sensitivity of the microprocessor 70 with respect to the feedback signals.

Various sensor means are mounted on the external housing 32 so as to be located in a position to sense one or more of selected parameters related to the operation of the liquid dispensing device 20. The various sensor means can comprise speed sensing means 120 to sense the speed of the dispensing aperture 34 with respect to the receiving surface 24 of the article 26 receiving the liquid 22. The speed sensing means 120 provide signals regarding the movement of the liquid dispensing device 20 with respect to the article 26 in separate X, Y, and Z directions. The sensor means can also comprise pressure sensing means 122 to sense the pressure of the liquid in the main chamber 30, or also can comprise temperature sensing means 124 to sense the temperature of the liquid in the main chamber 30. The sensor means may also include a flow rate sensor means 126 to sense the flow rate of the liquid exiting the main chamber 30 through the dispensing aperture 34, a position sensor means 128 to sense the selected position of the needle valve 50 in either of its full flow position, its flow precluding position, or any of the partial flow positions inbetween, or may comprise means to sense the presence of liquid in the main chamber 30 such as a light sensor 130. Also, the sensor means may comprise external sensors that are used to sense the presence or the height of the bead 23. Such external sensors might comprise a light transmitter and sensor unit 132, that transmits a narrow beam of infrared light towards the applied bead 23 of liquid on the receiving surface 24 and receives the reflected infrared light therefrom, or separate light transmitter and sensor elements **133*a* and 133*b*, or may comprise a video camera 134 to sense the height of an applied bead 23 of liquid on the receiving surface 24 of the article 26. In this case, the camera would need to be operatively connected to a computer (not shown) in order to make proper determination of the presence of the applied bead 23. Also, the sensor means could comprise a humidity sensor means 136 to sense the humidity of the atmosphere surrounding the liquid dispensing device 20**.

The various sensor means sense ongoing conditions of selected parameters representative of specific circumstances related to the operation of the liquid dispensing device 20, and generate quantitative values corresponding to the selected parameters. The various sensor means are connected in electrically conductive relation to the microprocessor 70 by means of electrical wires 82 so as to provide feedback signals regarding these parameters to the microprocessor 70. The feedback signals are derived from the quantitative values generated by the various sensor means. The microprocessor 70 is adapted to process the feedback signals in real time, and to provide control signals to the servomotor 60, wherein the control signals are a function of the feedback signals from the various sensor means. The microprocessor 70 thereby controls the servomotor 60 in accordance with the quantitative values generated by the sensor means. In this manner, the position of the valve 50, is moved to any selected partial flow position, as shown in FIG. 2. The servomotor 60 also provides feedback signals from an encoder 109 to the microprocessor 70 as to the relative position of the threaded elongate shaft 100 as it is rotated by the servomotor 60. The microprocessor 70 uses these feedback signals to ensure correct rotational positioning of the threaded elongate shaft 100 and thus the correct position of the needle valve 50.

In use, the needle valve 50 starts out in its flow precluding position, as shown in FIG. 1, and is moved by the piston 104, as controlled by selected ingress and egress of compressed air through the first 110 and second 112 apertures, as aforestated, to its full flow position, as shown in FIG. 3, or to a selected partial flow position by adjustment of the position of the threaded elongate shaft 100 by means of selective actuation of the servomotor 60 through to microprocessor 70, so that the liquid 22 can flow out of the nozzle 36 and be dispensed onto the receiving surface 24 of the article 26. As feedback signals regarding the various parameters being monitored by the sensor means 80 are received by the microprocessor 70, the needle valve 50 may be moved accordingly in a direction as indicated by arrow "F" to a somewhat reduced flow position, even to its flow precluding position—which is its ultimate reduced flow position—as shown in FIG. 1, and in the opposite other direction as indicated by arrow "S" to a somewhat increased flow position, even to its full flow position, as shown in FIG. 3. In this manner, a corrected flow rate of liquid 22 is dispensed from the dispensing aperture 34 of the nozzle 36, so as to provide a constant volume output of liquid 22 per unit length of liquid dispensed over the receiving surface 24 of the article 26.

It can be seen that the improved flow control mechanism 40 of the present invention is used to accurately control the rate of flow of liquid from the main chamber 30 through the dispensing aperture 34 in the dispensing nozzle 36. As part of this control, the initial "turn-on" of the liquid dispensing device 20—that is to say, the movement of the needle valve 50 from its flow precluding position to a partial flow permitting position or its full flow position—may be performed relatively slowly in a controlled manner, according to a predetermined "turn-on profile", so as to preclude a large amount of fluid from being initially dispersed. The "turn-on profile" is programmable into the microprocessor 70. The microprocessor 70 sends control signals according to the "turn-on profile" to the servomotor 60. Similarly, a suitable "turn-off" profile is also programmable into the microprocessor 70.

In an alternative embodiment, it is contemplated that stepper motors could be used in place of servomotors to rotate the threaded elongate shafts, in some applications.

Other modifications and alterations may be used in the design and manufacture of the apparatus of the present invention without departing from the spirit and scope of the accompanying claims.

What is claimed is:

1. An automatic continuous flow liquid dispensing device for dispensing liquid onto a receiving surface of an article, wherein said dispensing device has a main chamber defined by an external housing, an inlet for accepting liquid pumped from a remote source into said main chamber, a dispensing nozzle terminating in a remote outer end with a dispensing aperture of a selected cross-sectional area at said remote outer end of said dispensing nozzle, said dispensing aperture being in fluid communication with said main chamber, and valve means operatively mounted with respect to said external housing for selective positioning in either one of a full flow position and a flow precluding position and free movement between said full flow position and said flow precluding position; wherein said liquid dispensing device includes an improved flow control mechanism, comprising:

a threaded elongate shaft operatively retained in threaded engagement by a base member securely attachable to said external housing, so as to be selectively rotatably movable to any one of a plurality of stop positions, whereat said threaded elongate shaft is positioned to be contactable by said valve means, thereby acting as a backstop to preclude said valve means from reaching said full flow position, and thus defining a plurality of partial flow positions disposed between said full flow position and said flow precluding position;

electrically powered drive means mounted on said base member so as to engage said threaded elongate shaft in driving relation, whereby said threaded elongate shaft is rotatable by said electrically powered drive means in first and second rotational directions, thereby moving said threaded elongate shaft to a selected one of said plurality of stop positions;

control means operatively connected in electrically conductive relation to said drive means for selectively controlling said drive means;

sensor means mounted on said external housing to sense ongoing conditions of selected parameters representative of specific circumstances related to the operation of said liquid dispensing device, and to generate quantitative values corresponding to said selected parameters, said sensor means being connected in electrically conductive relation to said control means so as to provide feedback signals to said control means, said feedback signals being derived from said quantitative values generated by said sensor means;

wherein said control means is adapted to process said feedback signals in real time and to provide control signals to said drive means, wherein said control signals are a function of said feedback signals from said sensor means, said control means thereby controlling said drive means in accordance with said quantitative values.

2. The improved flow control mechanism of claim 1, wherein said valve means is movable from its full flow position to its flow precluding position by means of selected ingress and egress of said compressed air through first and second apertures.

3. The improved flow control mechanism of claim 1, wherein said electrically powered drive means comprises a servomotor.

4. The improved flow control mechanism of claim 1, wherein said control means comprises a microprocessor.

5. The improved flow control mechanism of claim 1, wherein said sensor means comprises means to sense the speed of said dispensing aperture with respect to said receiving surface of said article.

6. The improved flow control mechanism of claim 1, wherein said sensor means comprises means to sense the pressure of said liquid in said main chamber.

7. The improved flow control mechanism of claim 1, wherein said sensor means comprises means to sense the temperature of said liquid in said main chamber.

8. The improved flow control mechanism of claim 1, wherein said sensor means comprises means to sense the flow rate of said liquid exiting said main chamber through said dispensing aperture.

9. The improved flow control mechanism of claim 1, wherein said sensor means comprises means to sense the selected position of said valve means in any of said full flow position, said flow precluding position, and of said partial flow positions.

10. The improved flow control mechanism of claim 1, wherein said sensor means comprises means to sense the presence of said liquid in said main chamber.

11. The improved flow control mechanism of claim 1, wherein said sensor means comprises means to sense the presence of an applied bead of said liquid on said receiving surface of said article.

12. The improved flow control mechanism of claim 1, wherein said sensor means comprises means to sense the height of an applied bead of said liquid on said receiving surface of said article.

13. The improved flow control mechanism of claim 1, wherein said sensor means comprises means to sense the humidity of the atmosphere surrounding said liquid dispensing device.

* * * * *